(12) United States Patent
Kafai

(10) Patent No.: US 6,428,210 B1
(45) Date of Patent: Aug. 6, 2002

(54) PRECISION AIR BEARING SLIDE AND STAGE ASSEMBLY FOR CONTROLLED LINEAR MOTION

(75) Inventor: Berj Kafai, Granada Hills, CA (US)

(73) Assignee: Lintech Motion Control, Inc., Monrovia, CA (US)

(*) Notice: Subject to any disclaimer, the term of this patent is extended or adjusted under 35 U.S.C. 154(b) by 0 days.

(21) Appl. No.: 09/614,014

(22) Filed: Jul. 11, 2000

(51) Int. Cl.[7] ............................................... F16C 32/06
(52) U.S. Cl. ......................................................... 384/12
(58) Field of Search ............................. 384/100, 12, 13

(56) References Cited

U.S. PATENT DOCUMENTS

| | | | |
|---|---|---|---|
| 4,448,460 A | | 5/1984 | Yamamoto |
| 4,465,325 A | * | 8/1984 | Faure et al. ................... 384/12 |
| 4,630,942 A | * | 12/1986 | Tsumaki et al. ............... 384/12 |
| 4,974,970 A | * | 12/1990 | Sugita et al. .................. 384/12 |
| 4,978,233 A | * | 12/1990 | Stotzel et al. ................. 384/12 |
| 5,382,095 A | * | 1/1995 | Akutsu ........................ 384/100 |
| 5,971,614 A | | 10/1999 | Kane et al. ................... 384/12 |

FOREIGN PATENT DOCUMENTS

JP 06050339 * 2/1994 .................. 384/12

OTHER PUBLICATIONS

Internet Papers; New Way; Engineering Drawings; www.newwaybearings.com; 4 pages 1999.
Internet Papers; New Way; Air Bearings for Industry; www.newwaybearings.com; 5 pages 1999.
Internet Papers; ABTech inc. Air Bearing Specialists; Air Bearing Linear Slides; www.abtechmfg.com; 5 pages no date.

* cited by examiner

Primary Examiner—Thomas R. Hannon
(74) Attorney, Agent, or Firm—Christie, Parker & Hale, LLP

(57) ABSTRACT

An air bearing slide assembly including a carriage having a plurality of planar slide faces containing integrally mounted porous carbon air bearings, the carriage being movable over a slide ram. The slide faces of the carriage being mated to opposing planar slide surfaces on the slide ram, wherein compressed air expelled from the air bearings creates a hydrostatic fluid film between the slide ram and the air bearings, thereby separating and supporting the carriage for longitudinal movement over the slide ram.

17 Claims, 7 Drawing Sheets

PRECISION AIR BEARING SLIDE AND STAGE ASSEMBLY FOR CONTROLLED LINEAR MOTION

BACKGROUND OF THE INVENTION

The present invention relates to the field of air bearings, and more particularly to an air bearing slide assembly where an outer carriage assembly is slidably supported over an inner ram by a plurality of opposed air bearings contained within the carriage. The air bearings allow for precision linear movement of the carriage relative to the ram.

There has long been a need in the field of precision machining and other areas for linear slides capable of precise, repeatable, vibration free motion. Such linear slides have been primarily of two types. In the first type, a movable carriage traverses a fixed ram (essentially a beam) and in the second type, a movable ram slides within a fixed housing. Of the two types, in the latter arrangement, where the ram moves relative to a fixed housing, the ram may be extended a substantial distance from the frame. This cantilevered extension of the movable ram may cause the ram to droop from the housing or otherwise displace from a desired longitudinal axis. Such displacement creates undesirable vertical position error at the extended end of the ram. In the former arrangement, where the ram is fixed at both ends with the carriage traversing the ram, vertical deflection is minimized. For this reason the fixed ram—movable carriage type of linear slide is preferred.

In the past, contact bearings such as ball, roller, or tapered roller bearings were used to facilitate movement of the carriage along the ram. Contact bearings are relatively inexpensive and have high load carrying capability. Contact bearings remain in widespread use where high precision positioning is not required or where highs loads are involved.

More recently, hydrostatic bearings, more commonly referred to as air bearings, have been incorporated into linear slides for use in applications where extremely precise, smooth, repeatable motion, on the order of a few microinches, is required. Air bearings make use of well know hydrostatic principles. In an air bearing, a flat sliding surface in the carriage rests against a flat sliding surface on the ram. The air bearing operates by supplying pressurized air or other gas to an inlet orifice where the orifice acts as a throttle to produce a desired volume flow rate. After throttling, the air is ejected outwardly from the bearing. The outwardly ejected air produces a high pressure air cushion upon which the carriage rides over the ram. Air bearing equipped linear slides have minimal static friction and therefore offer the capability for increased smoothness and enhanced positioning accuracy, as well as a greater degree of vibration isolation than can be achieved in a contact bearing equipped slide.

Despite their advantages over contact bearing equipped slides, the use of air bearing equipped slides is limited by their high cost. For air bearings to be useful for precise positioning, high repeatability of position is desired for the movable carriage. Such repeatability is dependant not only on the means for moving the carriage (e.g., stepper motor, belt drive mechanism, etc.), but also on the precise mating of the air bearing surface with that of the ram.

Typical prior art air bearing equipped linear positioning slides are manufactured by New Way Machine Components, 4009 Market Street, Aston, Pa., and Dover Instrument Corporation, P.O. Box 200, Westboro, Md. These slides typically utilize a fixed ram—movable carriage design utilizing from 4–6 circular air bearings on the carriage sliding surfaces which are mated to the ram. Multiple bearings per slide surface are generally required to provide the linear slide assembly with a load carrying capacity sufficient to be useful in precision machining and other applications.

One problem common to most prior art air slides is alignment of the bearings. Typically, prior art slides mount each air bearing in a discrete bearing holder which is then installed in a bearing carrier, which is subsequently integrated into the carriage assembly. To provide for effective slide operation, each air bearing on a particular carriage slide surface must be aligned to be substantially coplanar with every other bearing on that surface. Since air bearing to ram slide surface air gaps are typically on the order of 5 to 20 microns, bearing alignment is both a critical and expensive process. Generally, alignment costs increase proportionately with the number of bearings per individual slide surface.

Air slides with misaligned bearings are susceptible to self-excited vibration or "whirring" of the carriage assembly. Typically, non-coplanar bearings generate eddy currents in the air cushion between the carriage and the ram. These eddy currents tend to induce vibration or whirring in the carriage as the carriage rides over the ram. Whirring significantly degrades carriage positioning accuracy. The problem of self-excited vibration may be compounded by the prior art methods of moving or driving the carriage. Prior art carriage drives are typically linear motors, ball and screw leads, and belt drive mechanisms. The vibration caused by these drive mechanisms may exacerbate "whirring" in a linear air slide.

An additional factor which tends to increase the cost of an air slide is the use of individual air supply hoses for each bearing. Although effective, this method of supplying pressurized air leads to a multiplicity of hoses and fittings which further complicates the air slide.

What is needed therefore is an air slide design that is substantially less costly to produce. Such a design would use a minimum of air bearings on each slide surface thereby reducing the difficulties associated with bearing alignment, yet would still provide at least as much load carrying capacity as the prior art slides. Such a design would also incorporate air feed passages internally within the carriage assembly to eliminate the multiplicity of air supply lines as is found in the prior art. Such a design would further reduce the number of component parts by mounting the air bearings directly within the carriage assembly and would use interchangeable modular components to further reduce complexity and costs. Finally, such a design would incorporate a more precise drive motor or actuating device for positioning the carriage assembly.

SUMMARY OF THE INVENTION

The present invention is an air bearing slide assembly for controlled linear motion. The slide assembly of the present invention overcomes many of the disadvantages of prior art air bearing slides. More precise position location is possible with the present slide assembly. It is more versatile than prior art linear slides in function and design, and is of quite simple manufacture, while achieving greater precision in bearing alignment and mating of the relative sliding surfaces.

The air bearing slide assembly of the present invention features a simplified carriage assembly including a first set of longitudinally extending upper and lower bearing carriers, where the upper and lower carriers are preferably interchangeable. The carriage assembly also includes a second set of left and right longitudinally extending bearing carriers, which are also preferably interchangeable. The four bearing carriers are integrated to form the carriage assembly. When joined, the carriers combine to form a longitudinal throughbore for mating with a slide ram.

In an exemplary embodiment, the upper and lower bearing carriers each mount two elongated planar rectangular air bearings, while the left and right bearing carriers each mount one elongated planar rectangular air bearing. By using a minimum number of bearings, the bearing alignment process is simplified. Further, rectangular air bearings have a greater load carrying capacity for a given width than do circular bearings of a similar diameter. To minimize the number of component parts, the air bearings in the present invention slide are preferably mounted directly in the bearing carriers. In addition, each carrier is preferably formed with internal air passages which interface with each mating bearing carrier so that a single external air supply port may pressurize all of the bearings in the carriage assembly.

The air bearing slide assembly of the present invention also includes an elongated slide ram which has a central longitudinal axis. The exterior of the slide ram is generally defined by a plurality of symmetrically opposed planar and longitudinally extending ram slide surfaces.

The slide ram is slideably receivable in the carriage assembly throughbore with the ram slide surfaces and the air bearing slide surfaces being in closely spaced slidable mated alignment to permit longitudinal movement of the carriage assembly relative to the slide ram. Precise mating of the air bearing slide surfaces to the ram slide surfaces is achieved by individual lapping of the mating surfaces. Such lapping is done to such an extent that an air bearing to ram air gap of typically about 5 microns to 20 microns is achieved. In operation, pressurized gas, typically compressed air, is supplied to the air bearings so that hydrostatic fluid support films, or air cushions, are created between the air bearings and the ram slide surfaces. Thereby, the carriage is suspended on the ram and is free to move longitudinally over the ram.

The present invention air slide also includes a piezo-electric drive motor which may be incorporated entirely within the carriage assembly and operably coupled to an indexed drive strip on the ram. The piezo-electric drive motor provides for more accurate positioning and smoother operation than has heretofore been possible. The air slide may further include a digital encoder which is also incorporated entirely within the carriage assembly and operably coupled to an indexed drive strip on the ram. Other features and advantages of the invention will become more apparent from the following detailed description of the invention, when taken in conjunction with the accompanying exemplary drawings.

DETAILED DESCRIPTION OF THE PREFERRED EMBODIMENTS

In the following detailed description reference will be made to air bearings and air bearing slide assemblies, as air bearings are most commonly driven by compressed air. However, those skilled in the art will understand that air bearings may be driven by any suitable pressurized gas such as carbon dioxide or nitrogen or other suitable gasses. Thus, for the purposes of this application the term "air bearing" is meant to be synonymous with the term "gas bearing" and is not intended to be limited to a bearing driven solely by compressed air.

Figure 1:
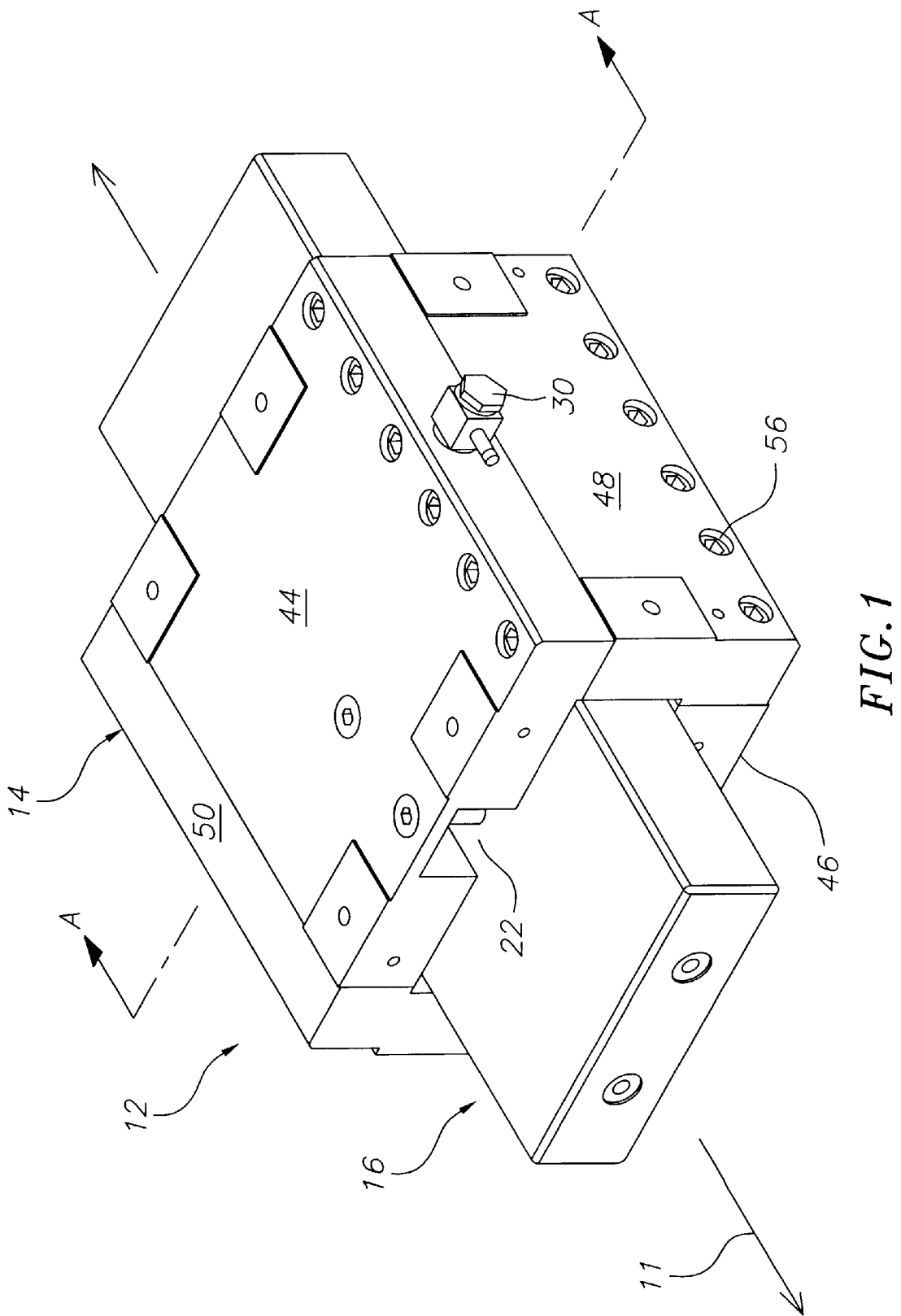
FIG. 1 is a perspective view of an air bearing slide embodying features of the present invention.

Referring now to FIG. 1, an exemplary embodiment of an air bearing slide assembly 12 in accordance with the present invention is depicted. The slide assembly has a first longitudinal axis 11, and includes a movable carriage assembly 14, and an elongated slide ram 16, about which the carriage assembly is free to translate axially.

Figure 2:
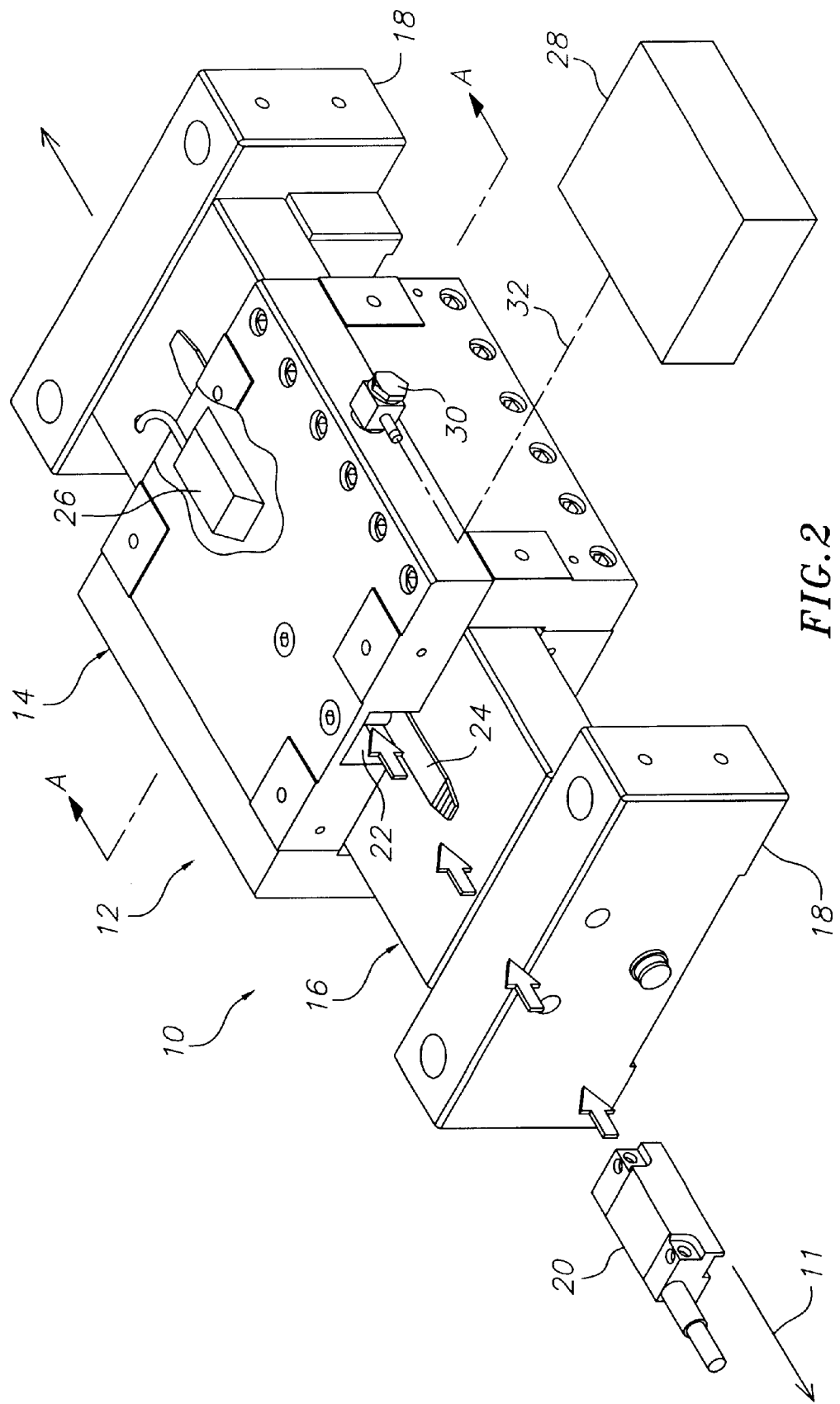
FIG. 2 is a perspective view of a linear positioning stage including the air slide shown in FIG. 1 and embodying additional features of the present invention.

Referring now to FIG. 2, an exemplary embodiment of a linear stage assembly 10 in accordance with the present invention is shown. The linear stage assembly incorporates the air bearing slide assembly 12, and also includes a pair of slide ram sub-bases 18, which support each end of the slide ram 16 and which are in turn mounted to a support structure (not shown). The support structure for the linear stage is typically custom built for each particular application.

The linear stage assembly 10 also includes a piezo-electric drive motor 20 which is sufficiently compact to be incorporated into an Instrument pocket 22 in the carriage assembly 14. The piezo-electric drive motor is operably connected to the slide ram 16 by means of a ribbed drive strip 24 which is fixed to the slide ram. The piezo-electric drive motor provides for smoother operation and more accurate and repeatable Positioning than has heretofore been possible in a linear positioning stage. In addition, the piezo-electric motor significantly reduces the overall size of the positioning stage in comparison to prior art designs using external driving devices. Although, the piezo-electric motor is the preferred method of driving the carriage assembly, the present invention positioning stage is not limited to this motor, but rather may be used with conventional externally mounted driving devices such as linear motors, actuators, ball and lead screws, and belt drive mechanisms (not shown).

The linear stage assembly 10 additionally incorporates a device for tracking the movement of the carriage assembly 14 relative to the ram 16. Preferably, the tracking device is a digital encoder 26 which, like the piezo-electric motor 20, is also integrated into the carriage assembly. The digital encoder is operably connected to the slide ram by means of a sensing strip (not shown), similar to the motor drive strip 24, containing a series of calibrated markings which may be sensed by the read head of the encoder. Although, a digital encoder is the preferred means of tracking carriage movement relative to the slide ram, other position location devices such as optical encoders whether mounted internally or externally of the carriage are also suitable.

Both the digital encoder and the piezo-electric drive motor may be placed axially in-line at opposite ends of the carriage assembly 14 or may be located side by side or may be placed at any convenient position within the carriage assembly. The positioning shown in FIG. 2 is meant to be exemplary and is not meant to be limiting.

A further component of the linear stage assembly 10, is a compressor 28 or other means for supplying pressurized air or gas to the air slide 12. The pressurized air is supplied to an external air supply port 30 mounted on the carriage 14, via a supply line 32. The air supply port or inlet port 30 is preferably made of brass. Generally, the compressor or other source of compressed air or gas is supplied by the end user of the linear stage assembly.

Figure 3:
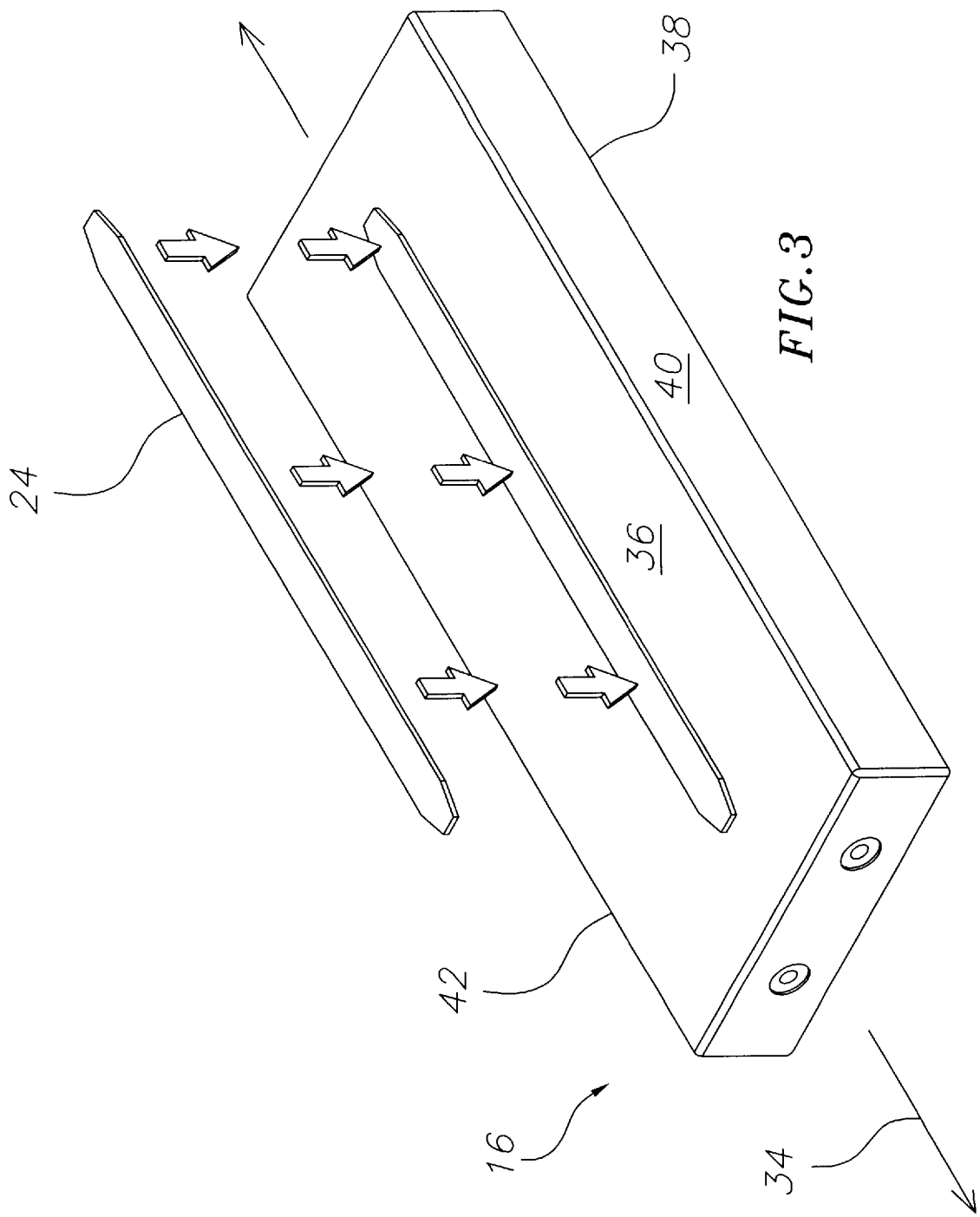
FIG. 3 is a perspective view of a slide ram in accordance with the present invention.

Referring briefly to FIG. 1, as stated previously, the air bearing slide assembly 12 comprises the carriage assembly 14 and the ram 16. As shown in more detail in FIG. 3, the slide ram has a central longitudinal axis 34 which is coincident with the slide assembly longitudinal axis 11 (FIGS. 1 and 2). In the exemplary embodiment, the slide ram in lateral cross-section has four exterior, longitudinally extending, planer surfaces 36–42. Preferably, the planar surfaces are parallel to the central axis 34 and surfaces 36 and 38 are mutually opposing as are surfaces 40 and 42. Surfaces 36 and 38 are perpendicular to surfaces 40 and 42. Generally, in lateral cross-section the planar surfaces will form a rectangular or square shape. In alternative embodiments, however, the ram may have fewer than four planar surfaces or may have surfaces which are curved or otherwise non-planar. Preferably, the slide ram is made of polished granite with the planar sliding surfaces having a surface roughness within the range of about 5 microns to about 10 microns. However, the slide ram may be made of any suitable material having the requisite strength to support the carriage and its working load. Suitable alternative materials are steel and aluminum among others.

Figure 4:
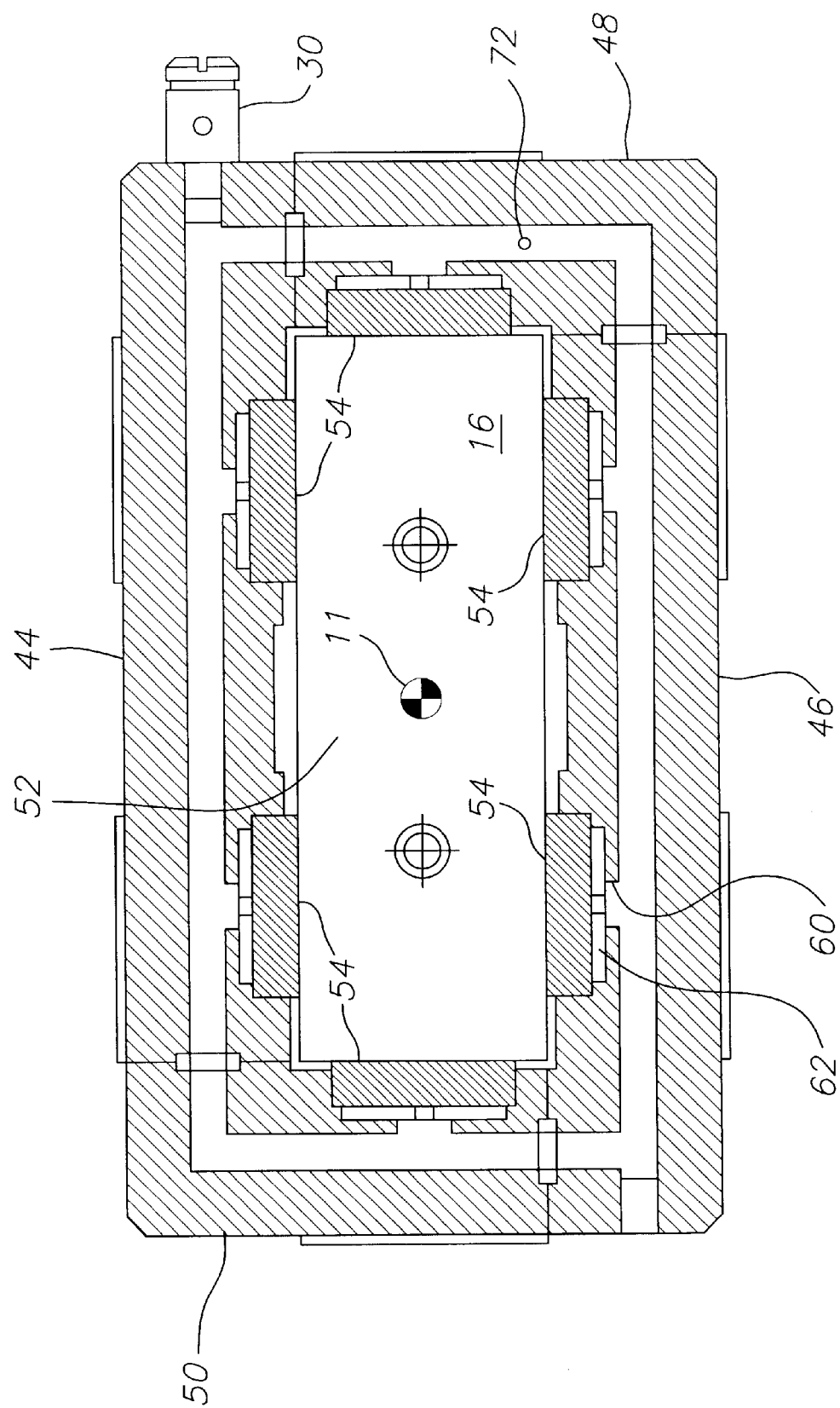
FIG. 4 is a cross-sectional view, taken along the line A—A, of the air slide shown in FIG. 1.
Figure 5:
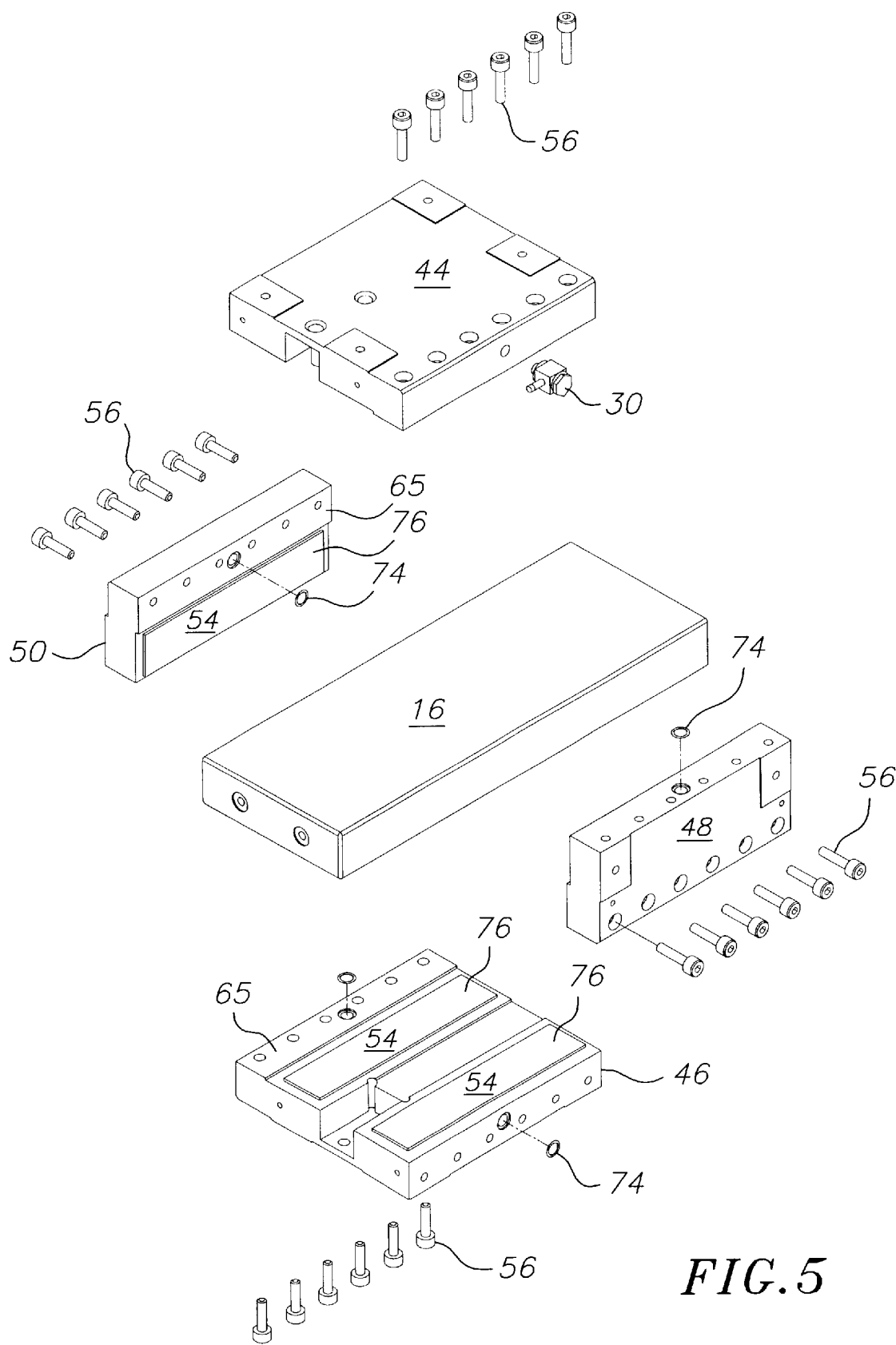
FIG. 5 is an exploded view of the air slide shown in FIG. 1.
Figure 6:
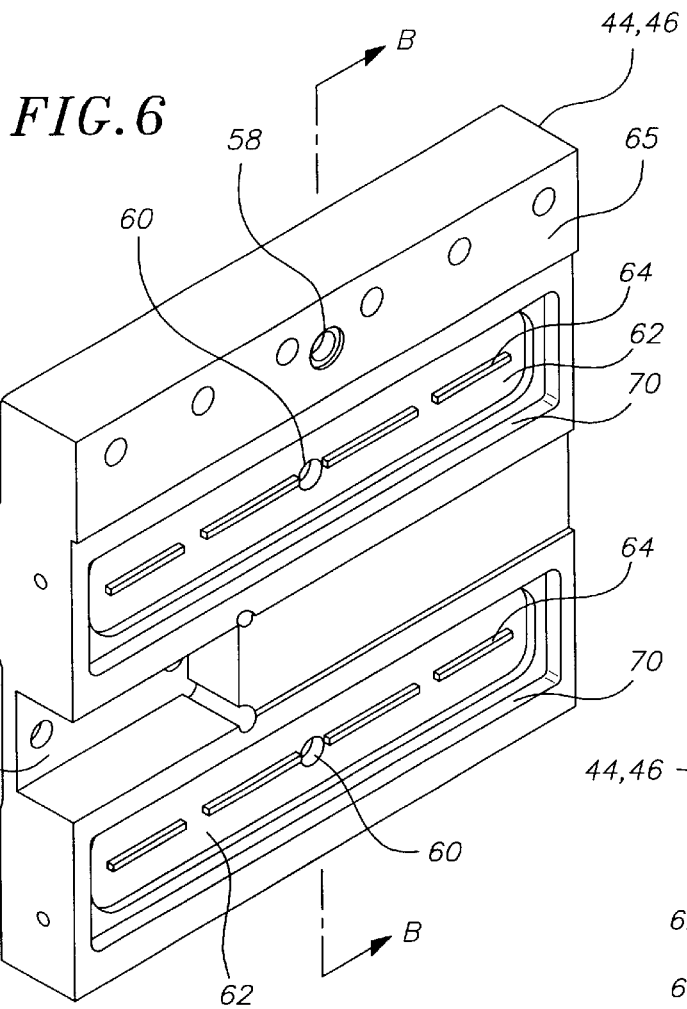
FIG. 6 is a perspective view of a horizontal bearing carrier embodying features of the present invention.

Referring now to FIGS. 1, 4 and 5, the carriage assembly 14 comprises four bearing carriers, an upper horizontal bearing carrier 44, a lower horizontal bearing carrier 46, a left vertical bearing carrier 50, and a right vertical bearing carrier 48. Each bearing carrier includes at least one air bearing 54 (FIGS. 4–5). The bearing carriers are secured together by suitable fastening means such as the assembly screws 56. In the exemplary embodiment, six screws are used to attach each bearing carrier to an adjacent bearing carrier. When the bearing carriers are integrated to form the carriage assembly as is shown in FIG. 1, a longitudinal throughbore 52 is defined (FIG. 4). The throughbore is co-linear with the first longitudinal axis 11 and slide ram central axis 34. The slide ram 16 is adapted to be slidably received in the throughbore 52 and the planar exterior faces 36–42 of the slide ram are in opposed relationship to the air bearings 54 contained within the bearing carriers 44 50.

Referring now to FIGS. 6–7 and 8–9, the upper horizontal bearing carrier 44 and the left vertical bearing carrier 50 are depicted. In reference to these figures, like numerals will be used to refer to like features. In the exemplary embodiment, the bearing carriers are machined from plate stock, with aluminum being the preferred material. Many other materials, such as steel and titanium, as well as structural plastics are also suitable. Each bearing carrier has a precision machined interface surface 65 which mates the particular carrier to an adjacent carrier. The bearing carriers feature recessed bearing pockets 70 for receipt of the air bearings 54. Each bearing pocket includes bearing support ridges 64, a recessed air chamber 62 located behind each installed air bearing, and a throttling port 60 which controls the volume of air flow into the air chamber and subsequently through the air bearing.

Figure 7:
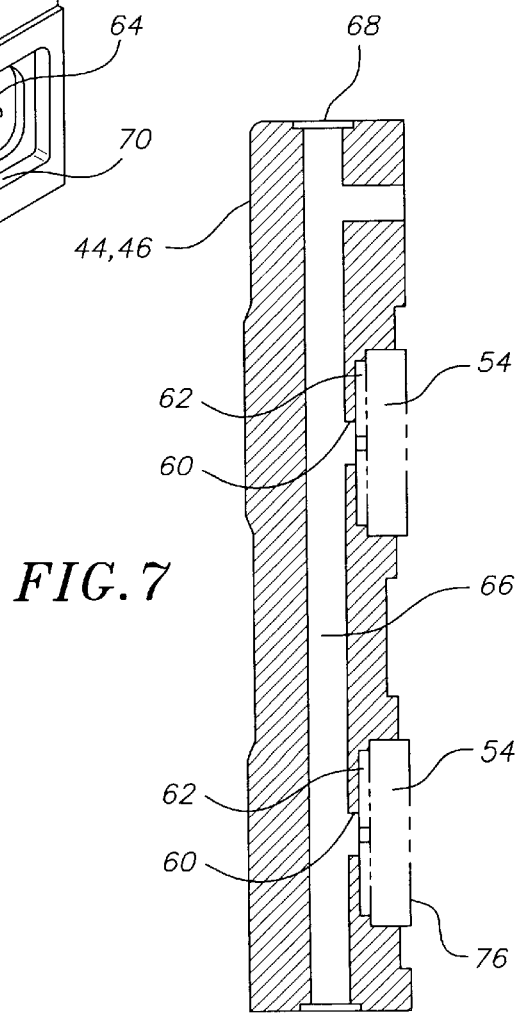
FIG. 7 is a cross-sectional view, taken along the line B—B, of the bearing carrier shown in FIG. 6.
Figures 8, 9:
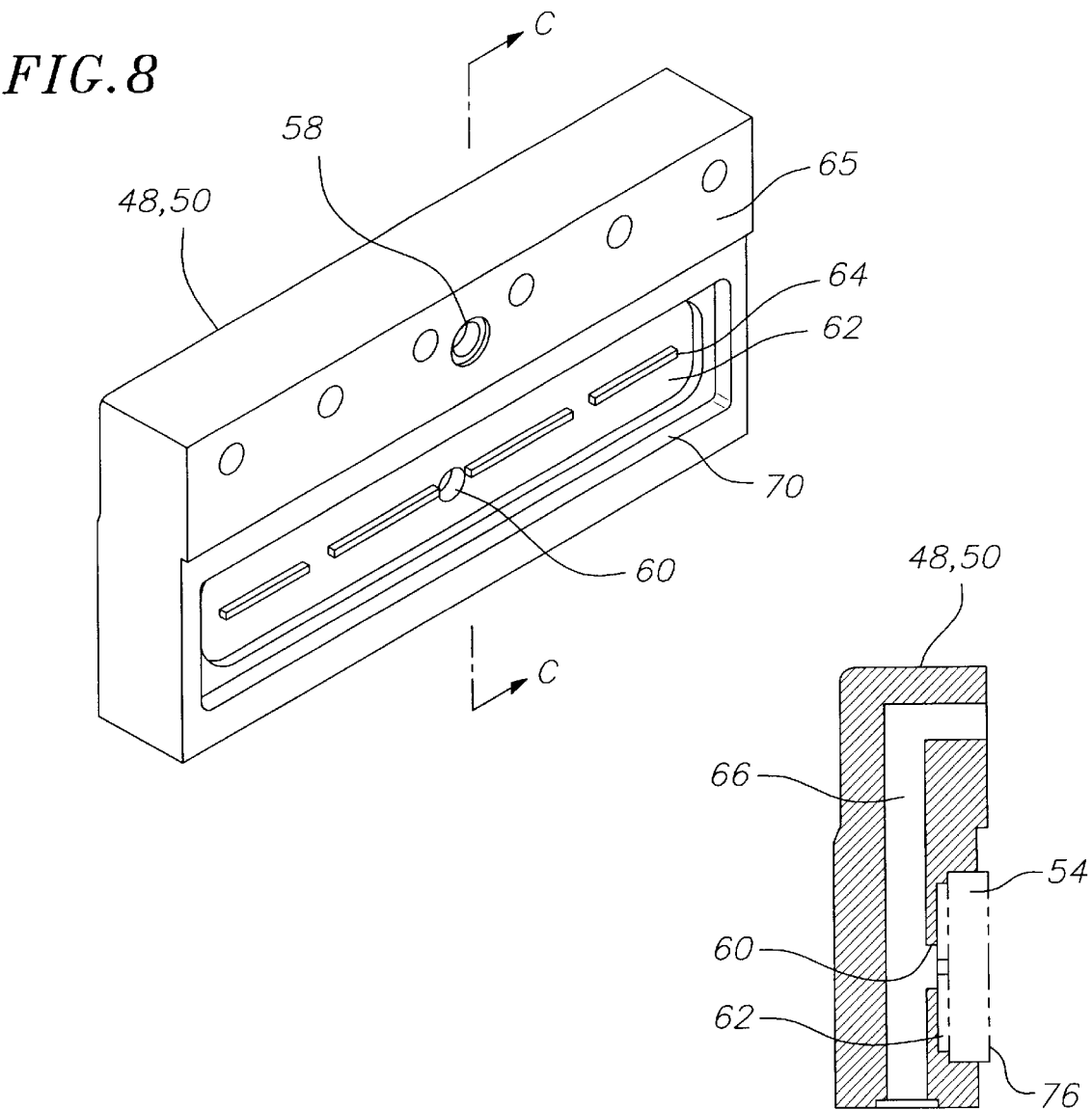
FIG. 8 is a perspective view of a vertical bearing carrier embodying features of the present invention.
FIG. 9 is a cross-sectional view, taken along the line C—C, of the bearing carrier shown in FIG. 8.

With particular reference to FIGS. 7 and 9, each bearing carrier 44–50 includes a centrally located air supply passage 66. Each air supply passage supplies each bearing 54 in its respective carrier with pressurized air. When the bearing carriers are integrated to form the carriage assembly 14, the individual air supply passages combine to form a continuous central air passage 72 as is shown in FIG. 4. Each bearing carrier also includes an O-ring groove 58 which seals the air supply passages 66 by means of an O-ring 74 (FIG. 5) when the bearing carriers are integrated. Each horizontal bearing carrier also includes an air inlet passage 68. Upon integration to form the carriage assembly one of these passages is fitted with the air inlet port 30 and the other inlet passage is plugged.

Each vertical (48 and 50) and each horizontal (44 and 46) bearing carrier also includes at least one air bearing 54. In the exemplary embodiment, two air bearings are installed in each horizontal bearing carrier and one air bearing is installed in each vertical bearing carrier.

Referring now to FIG. 5, it may be seen from the exemplary embodiment that the upper 44 and lower 46 horizontal bearing carriers are interchangeable as the two bearing carriers are identical. Upon assembly, one carrier is axially spaced and rotated 180 degrees from the other carrier. Like the horizontal carriers, the right 48 and left 50 vertical bearing carriers are also interchangeable, as they also are identical and are also axially spaced and rotated 180 degrees during installation. By making the upper and lower horizontal bearing carriers interchangeable, and the left and right vertical bearing carriers interchangeable, substantial costs savings are achieved in production of the linear slide assembly 12.

The upper 44 and lower 46 horizontal bearing carriers each additionally include an instrumentation cavity 22. These cavities are intended to allow for internal mounting within the carriage assembly 14 of a piezo-electric drive motor 20 and/or a digital encoder 26. If desired the instrumentation cavities may also be located in the vertical bearing carriers.

The air bearings 54 used in the slide assembly 12 are of an elongated rectangular shape and have a longitudinally extending slide face 76. The longitudinally extending slide face is ground flat such that it is planar within a range of about 5 microns to about 10 microns. Rectangular air bearings placed in opposing relationship to flat ram surfaces provide more surface area and thus greater load carrying capacity than prior art in-line circular bearings, where the diameter of the circular bearings is equivalent to the width of the rectangular bearings. Preferably, the air bearings of the present invention are made from porous carbon having a porosity in the range 10%–30% by volume with 10% to 20% being preferred. Porous carbon is available from Carbon Technology, Inc., 659 South County Trail, Exter, R.I. Other suitable materials for the air bearing are porous carbon-graphite, porous carbon-silicates, and porous bronze. Other materials are also suitable.

Referring now to FIGS. 6–9, an air slide 12 in accordance with the present invention may be manufactured, in general terms, as described below. The method described is meant to be exemplary. Other suitable methods of assembling an air slide are known in the art. The bearing carriers 44–50 are machined from bar or plate stock, preferably of aluminum. Particular care is given to grinding the reference surface 65 (most clearly shown in FIGS. 6 and 8). This reference surface is used as a datum for the grinding or lapping of the air bearings 54. It is recommended that the reference surface be ground planer to within a tolerance of about 5 to 10 microns. After the bearing carriers are machined and the reference surface is ground the carriers are anodized for corrosion protection.

Subsequently, the air bearings 54 are bonded or otherwise secured to the ribs 64 within the bearing pockets 70. When the bearings are within the bearing pockets, the air chambers 62 located behind the bearings are defined. A suitable bonding agent is Loctite Type 454 Prism. Other bonding agents are also suitable and are known in the art.

Once the air bearing to bearing carrier joint has cured, the slide surfaces 76 of the bearings 54 in each carrier 44–50 are ground and lapped to be planer within a tolerance of about 5 to 10 microns. It is important to note that the air bearings are not ground individually, but rather all bearings mounted within a particular carrier are ground and lapped jointly. In situations where a plurality of bearings are mounted in one bearing carrier, for example the horizontal bearing carriers of the exemplary embodiment, the air bearings should be ground and lapped such that they are mutually co-planar within a range of about 5 microns to about 10 microns. By grinding and lapping the bearings jointly, a substantial cost savings is achieved.

The completed bearing carriers 44–50 arranged for further assembly are shown in FIG. 5. The O-ring seals 74 are fitted into the O-ring grooves 58 and the carriers are loosely bolted together by means of the screws 56 to form the carriage assembly 14. Subsequently, the carriage assembly is slipped over the ram 16 and the process of carriage to ram fit-up takes place. Carriage to ram fit-up is the process of setting the carriage to ram air gap.

Carriage 14 to ram 16 fit-up may be accomplished by several means. Three will be outlined below. One approach is to apply vacuum to the air inlet port 30 and consequently to the air bearings 54. The application of vacuum causes the bearings to pull the bearing carriers 44–50 tightly against the ram. Thereafter, the bolts 56 may be tightened accordingly to achieve a minimum clearance fit of the carriage to the ram.

Another approach is to apply positive pressure to the bearings 54 which tends to force the bearing carriers 44–50 away from the ram 16 . Tightening the screws 56 against the positive pressure creates particularly uniform spacing of the carriage 14 about the ram.

Yet another approach is to manually apply pressure to the carriage assembly 14 and then tighten the fastening screws 56. This approach has also produced good results in obtaining a good ram to carriage fit. All of the approaches described are suitable for fitting the carriage 14 to the ram 16 and as yet none of the approaches has proven to be demonstrably superior to the others. Upon completion of the carriage to ram fit-up process the air slide is substantially complete and will appear as shown in FIG. 1.

One advantage of using four separate bearing carriers 44–50 to form the carriage 14 Is that the carriage assembly may be readily disassembled for maintenance by removing the bolts 56. In addition, fine adjustment of the carriage 14 to ram 16 air gap may be accomplished by loosening the bolts 56 to increase the air gap or further tightening the bolts to decrease the air gap.

In the exemplary embodiment, four bearing carriers 44–50 are used to form a carriage assembly 14 which has a throughbore 52 which fully encloses the ram 16. However, the throughbore 52 need not fully enclose the ram. Alternative embodiments where the bearing carriers form a U-shaped carriage assembly may also be used.

It will be appreciated that the present invention provides a new air bearing linear slide 12 and linear motion stage assembly 10 where the carriage assembly 14 is supported over the slide ram 16 by a plurality of porous carbon air bearings 54 which are integrally mounted within the carriage assembly. The unique construction of the carriage assembly of the present invention allows for more precise mating of the sliding surfaces of the ram and carriage and consequently for more precise positioning of the carriage along the ram, at substantially lower cost, than prior art linear slides. The air slide of the present invention is capable of operating at air pressures over a range of about 10–80 psi, where 10 psi applied pressure will first float the carriage over the ram and 80 psi applied pressure corresponds to the maximum working pressure of the air slide.

It will be further appreciated that the piezo-electric drive motor 20, which may be incorporated within the carriage 14, of the linear positioning stage 10 of the present invention, allows for more precise carriage positioning than has heretofore been possible. Also, the digital encoder 26 that may be incorporated into the carriage assembly allows for precise tracking of the position of the carriage. In addition, the carriage assemblies are intended to be modular, the linear air stage may utilize one or more carriage assemblies 14, mounted on the same ram, for increased load carrying capacity. The multiple carriage assemblies may be set up to move independently of each other or may be set up to move in conjunction with each other as the specific application requires.

While only the presently preferred embodiment has been described in detail, as will be apparent to those skilled in the art, modifications and improvements may be made to the device disclosed herein without departing from the scope of the invention. Accordingly, it is not intended that the invention be limited except as by the appended claims.

What is claimed is:

1. A carriage assembly adapted to be slidably mated to a slide ram for use in a linear slide assembly, the carriage assembly comprising:

a plurality of gas bearings;

upper and lower horizontal bearing carriers;

left and right vertical bearing carriers;

each bearing carrier being adapted to hold at least one gas bearing, the carriers including a throttling port which opens to a recessed gas cavity, the port and cavity being positioned behind each gas bearing;

each carrier further including at least one internal passageway for delivering pressurized gas to the throttling port, wherein the pressurized gas enters the recessed cavity and is expelled through the gas bearing;

the internal gas delivery passageways being aligned such that when the upper and lower horizontal carriers are attached to the left and right vertical carriers, one continuous passageway is formed such that each gas bearing in each respective carrier may be pressurized from a single external gas supply port; and fasteners for attaching the upper and lower bearing carriers to the left and right bearing carriers.

2. The carriage assembly of claim 1, wherein the gas bearings in the respective upper and lower bearing carriers are held in a mutually opposed axially spaced relationship.

3. The carriage assembly of claim 2, wherein each gas bearing has a slide face that is planar within a tolerance of about 5 microns to about 10 microns.

4. The carriage assembly of claim 1, wherein the gas bearings in the respective left and right bearing carriers are held in a mutually opposed axially spaced relationship.

5. The carriage assembly of claim 1, wherein the internal passageways in each bearing carrier are sealed against gas leakage at the passageway interface in each adjacent carrier by at least one O-ring at each interface.

6. The carriage assembly of claim 1, wherein the fasteners for attaching the upper and lower bearing carriers to the left and right bearing carriers includes removable mechanical fasteners, thereby allowing the carriage assembly to be readily disassembled for maintenance and further allowing the upper and lower bearing carriers to be adjusted to increase or decrease the gas bearing flotation gap.

7. The carriage assembly of claim 1, wherein each gas bearing has a planar slide face suitable for bearing against a slide ram.

8. The carriage assembly of claim 1, wherein each gas bearing has an elongated rectangular slide face suitable for bearing against a slide ram.

9. The carriage assembly of claim 1, wherein each gas bearing has a porous slide surface made from a material having a porosity within the range of about 10% to 20% by volume.

10. The carriage assembly of claim 1, wherein each gas bearing is made from a material selected from the group consisting of porous carbon, porous carbon-graphite, and porous bronze.

11. The carriage assembly of claim 1, wherein each horizontal bearing carrier includes two gas bearings.

12. The carriage assembly of claim 11, wherein the bearings in each bearing carrier are co-planar within a tolerance of about 5 microns to about 10 microns.

13. The carriage assembly of claim 11, wherein each gas bearing has an elongated rectangular slide face.

14. The carriage assembly of claim 1, wherein each vertical bearing carrier includes one gas bearing.

15. The carriage assembly of claim 14, wherein each gas bearing has an elongated rectangular slide face.

16. The carriage assembly of claim 1, wherein the upper and lower horizontal bearing carriers are interchangeable.

17. The carriage assembly of claim 1, wherein the left and right vertical bearing carriers are interchangeable.

* * * * *